(12) United States Patent
Reid et al.

(10) Patent No.: US 10,010,983 B2
(45) Date of Patent: Jul. 3, 2018

(54) EXPANDABLE MEMBER WITH WAVE INHIBITOR AND METHODS OF USING THE SAME

(75) Inventors: Leonard Frederick Reid, Issaquah, WA (US); James Ross, Seattle, WA (US); Tim Johnson, Seattle, WA (US); Taeksun Nam, Kirkland, WA (US); Doug Glenn, Des Moines, WA (US); Matt Shultz, Maple Valley, WA (US)

(73) Assignee: Fatigue Technology, Inc., Seattle, WA (US)

( * ) Notice: Subject to any disclaimer, the term of this patent is extended or adjusted under 35 U.S.C. 154(b) by 1674 days.

(21) Appl. No.: 12/399,817

(22) Filed: Mar. 6, 2009

(65) Prior Publication Data

US 2010/0000280 A1    Jan. 7, 2010

Related U.S. Application Data

(60) Provisional application No. 61/034,843, filed on Mar. 7, 2008.

(51) Int. Cl.
| B23P 9/02 | (2006.01) |
| B21D 24/02 | (2006.01) |
| B21D 39/06 | (2006.01) |
| B21J 15/04 | (2006.01) |

(52) U.S. Cl.
CPC .............. *B23P 9/025* (2013.01); *B21D 24/02* (2013.01); *B21D 39/06* (2013.01); *B21J 15/04* (2013.01)

(58) Field of Classification Search
USPC .............. 29/505, 506, 507, 512, 522.1, 523, 29/243.518, 243.517; 72/370.01, 370.02, 72/370.06, 370.07, 370.08; 16/2.1, 2.5
See application file for complete search history.

(56) References Cited

U.S. PATENT DOCUMENTS

| 295,593 A | 3/1884 | Thayer |
| 810,430 A | 1/1906 | Pfluger et al. |
| 1,081,496 A | 12/1913 | Gillmor |
| 1,106,964 A | 8/1914 | Pahler |
| 1,226,090 A | 5/1917 | Ludlum |

(Continued)

FOREIGN PATENT DOCUMENTS

| AU | 2007204888 B2 | 7/2007 |
| BR | PI0706509-4 A2 | 3/2011 |

(Continued)

OTHER PUBLICATIONS

Merriam Webster's Collegiate Dictionary, Tenth Edition, 1997, p. 154.

(Continued)

*Primary Examiner* — Christopher M Koehler
(74) *Attorney, Agent, or Firm* — Seed IP Law Group LLP

(57) ABSTRACT

A member has a wave inhibitor adapted to control the effects of a wave of longitudinally displaced material positioned ahead of an expansion mandrel used to expand the member. The wave inhibitor has a decreasing transverse cross-sectional area to diminish the effects attributable to the wave, such as workpiece distortions, material upset of the workpiece, lengthening of the member, and excessively high strains in the workpiece. The wave inhibitor can also induce radially compressive stresses in the workpiece and produce an interference fit.

10 Claims, 10 Drawing Sheets

(56) References Cited

U.S. PATENT DOCUMENTS

| | | | |
|---|---|---|---|
| 1,297,142 A | 3/1919 | Gibbons | |
| 1,480,298 A | 1/1924 | Pearson | |
| 1,881,867 A | 10/1932 | Nelson | |
| 1,979,686 A | 11/1934 | Hall et al. | 85/40 |
| 2,092,358 A | 9/1937 | Robertson | 285/56 |
| 2,146,461 A * | 2/1939 | Bettington | 29/512 |
| 2,150,361 A | 3/1939 | Chobert | 153/79 |
| 2,188,596 A | 1/1940 | Hobert | 16/2 |
| 2,275,451 A | 3/1942 | Maxwell | 29/157.5 |
| 2,282,711 A | 5/1942 | Eklund | |
| 2,357,123 A | 8/1944 | Maxwell | 153/80.5 |
| 2,385,294 A | 9/1945 | Lowy | 16/3 |
| 2,405,399 A | 8/1946 | Bugg et al. | 153/80 |
| 2,430,554 A | 11/1947 | Bugg et al. | 153/80 |
| 2,433,425 A | 12/1947 | Burckle | 285/84 |
| 2,468,985 A * | 5/1949 | Krotz | 403/225 |
| 2,501,567 A | 3/1950 | Huck | |
| 2,528,180 A | 10/1950 | Roehl | 248/56 |
| 2,538,623 A | 1/1951 | Keating | |
| 2,583,719 A | 1/1952 | White | |
| 2,608,751 A | 9/1952 | Hutton | |
| 2,661,182 A | 12/1953 | Kipp | 251/76 |
| 2,672,175 A | 3/1954 | Howard | 153/80 |
| 2,695,446 A | 11/1954 | Meyer | 29/523 |
| 2,700,172 A | 1/1955 | Rohe | 16/2 |
| 2,808,643 A | 10/1957 | Weatherhead, Jr. | 29/508 |
| 2,887,003 A | 5/1959 | Brilmyer | |
| 2,943,667 A | 7/1960 | Ewing et al. | 153/80 |
| 3,107,572 A | 10/1963 | Orloff | |
| 3,128,999 A | 4/1964 | Schmitt | 267/1 |
| 3,129,630 A | 4/1964 | Wing et al. | |
| 3,137,887 A | 6/1964 | Mannino et al. | 16/2 |
| 3,149,860 A | 9/1964 | Hallesy | 285/18 |
| 3,164,054 A | 1/1965 | Biesecker | 85/8.8 |
| 3,222,977 A | 12/1965 | Vaughn | |
| 3,244,034 A | 4/1966 | Severdia | 77/62 |
| 3,252,493 A | 5/1966 | Smith | 151/41.7 |
| 3,262,353 A | 7/1966 | Waeltz et al. | |
| 3,290,770 A | 12/1966 | Silverman et al. | |
| 3,345,730 A | 10/1967 | Laverty | 29/243.52 |
| 3,358,492 A | 12/1967 | Richter | 72/393 |
| 3,377,907 A | 4/1968 | Hurd | |
| 3,399,435 A | 9/1968 | Ackerman | |
| 3,434,746 A | 3/1969 | Watts | 285/162 |
| 3,443,474 A | 5/1969 | Blakeley et al. | |
| 3,498,648 A | 3/1970 | Hallesy | 285/343 |
| 3,537,163 A | 11/1970 | Steidl | 29/149.5 |
| 3,566,662 A | 3/1971 | Champoux | 72/370 |
| 3,578,367 A | 5/1971 | Harvill et al. | |
| 3,596,948 A | 8/1971 | Spoehr | |
| 3,601,771 A | 8/1971 | Dozier | |
| 3,643,544 A | 2/1972 | Massa | |
| 3,657,956 A | 4/1972 | Bradley et al. | |
| 3,674,292 A | 7/1972 | Demler, Sr. | 285/174 |
| 3,677,684 A | 7/1972 | Platz | |
| 3,678,535 A | 7/1972 | Charles | |
| 3,693,247 A | 9/1972 | Brown | 29/512 |
| 3,695,324 A | 10/1972 | Gulistan | |
| 3,763,541 A | 10/1973 | Jaffe | 29/212 D |
| 3,765,078 A | 10/1973 | Gulistan | |
| 3,778,090 A | 12/1973 | Tobin | 285/222 |
| 3,787,945 A | 1/1974 | Pasek et al. | 29/157.4 |
| 3,820,297 A | 6/1974 | Hurd | 52/758 F |
| 3,835,525 A | 9/1974 | King, Jr. | 29/412 |
| 3,835,688 A * | 9/1974 | King, Jr. | 72/370.07 |
| 3,837,208 A * | 9/1974 | Davis et al. | 72/370.07 |
| 3,875,649 A | 4/1975 | King, Jr. | 29/418 |
| 3,878,760 A | 4/1975 | Jeal et al. | |
| 3,879,980 A | 4/1975 | King, Jr. | |
| 3,892,121 A | 7/1975 | Champoux et al. | 72/393 |
| 3,895,409 A | 7/1975 | Kwatonowski | 16/2 |
| 3,915,052 A | 10/1975 | Ruhl | 85/7 |
| 3,934,325 A | 1/1976 | Jaffe | 29/243.52 |
| 3,943,748 A | 3/1976 | King, Jr. | |
| 3,949,535 A * | 4/1976 | King, Jr. | 403/388 |
| 3,997,193 A | 12/1976 | Tsuda et al. | 285/47 |
| 4,003,288 A * | 1/1977 | Jeal | 411/70 |
| 4,044,591 A | 8/1977 | Powderley | |
| 4,089,247 A | 5/1978 | Dahl et al. | |
| 4,142,439 A | 3/1979 | Landt | |
| 4,143,580 A | 3/1979 | Luhm | 85/77 |
| 4,157,675 A | 6/1979 | King, Jr. | |
| 4,164,807 A * | 8/1979 | King, Jr. | 29/523 |
| 4,168,650 A | 9/1979 | Dahl et al. | |
| 4,186,787 A | 2/1980 | Husain | |
| 4,187,708 A | 2/1980 | Champoux | 72/30 |
| 4,230,017 A | 10/1980 | Angelosanto | |
| 4,237,768 A | 12/1980 | Volkmann | |
| 4,249,786 A | 2/1981 | Mahoff | 339/15 |
| 4,295,691 A | 10/1981 | Rubenthaler | |
| 4,355,612 A | 10/1982 | Luksch | 123/41.08 |
| 4,364,697 A | 12/1982 | Binns | |
| 4,370,081 A | 1/1983 | Briles | |
| 4,371,154 A | 2/1983 | Winbigler | |
| 4,386,515 A | 6/1983 | Starke | 72/391 |
| 4,397,061 A | 8/1983 | Kanzaka | 16/2 |
| 4,405,256 A | 9/1983 | King, Jr. | 403/408 |
| 4,423,619 A | 1/1984 | Champoux | 72/393 |
| 4,425,780 A | 1/1984 | Champoux | 72/370 |
| 4,447,944 A | 5/1984 | Mohrman | 29/512 |
| 4,457,652 A | 7/1984 | Pratt | |
| 4,471,643 A | 9/1984 | Champoux et al. | 72/391 |
| 4,482,089 A | 11/1984 | Lindahl et al. | 228/173 C |
| 4,491,358 A | 1/1985 | Choung | |
| 4,494,398 A | 1/1985 | Svoboda | |
| 4,522,378 A | 6/1985 | Nelson | 267/141.4 |
| 4,524,600 A | 6/1985 | Champoux et al. | 72/391 |
| 4,530,527 A | 7/1985 | Holmberg | 285/382.4 |
| 4,557,033 A | 12/1985 | Champoux | 29/525 |
| 4,557,650 A | 12/1985 | Molina | |
| 4,579,491 A | 4/1986 | Kull | |
| 4,583,388 A | 4/1986 | Hogenhout | 72/393 |
| 4,595,324 A | 6/1986 | Sadri | |
| 4,597,282 A | 7/1986 | Hogenhout | 72/370 |
| 4,609,315 A | 9/1986 | Briles | |
| 4,627,775 A | 12/1986 | Dixon | |
| 4,640,479 A | 2/1987 | Shely et al. | 248/56 |
| 4,659,271 A | 4/1987 | Pratt et al. | |
| 4,659,272 A | 4/1987 | Pratt | |
| 4,665,732 A | 5/1987 | Hogenhout | 72/393 |
| 4,699,212 A | 10/1987 | Andersson et al. | 165/167 |
| 4,699,522 A | 10/1987 | Jeal | |
| 4,702,655 A | 10/1987 | Kendall | |
| 4,732,518 A | 3/1988 | Toosky | |
| 4,752,169 A | 6/1988 | Pratt | |
| 4,755,904 A | 7/1988 | Brick | 361/177 |
| 4,759,237 A | 7/1988 | Fauchet et al. | 81/53.2 |
| 4,787,793 A | 11/1988 | Harris | 411/339 |
| 4,809,420 A | 3/1989 | Landy et al. | 29/523 |
| 4,832,548 A | 5/1989 | Strobel | |
| 4,869,091 A | 9/1989 | Shemeta | 72/393 |
| 4,872,332 A | 10/1989 | Potzas | |
| 4,877,363 A | 10/1989 | Williamson et al. | |
| 4,885,829 A | 12/1989 | Landy | 29/156.8 R |
| 4,950,205 A | 2/1990 | Sadri | |
| 4,905,766 A | 3/1990 | Dietz et al. | 169/91 |
| 4,934,038 A | 6/1990 | Caudill | 29/523 |
| 4,934,170 A | 6/1990 | Easterbrook et al. | 72/370 |
| 4,900,115 A | 8/1990 | Sadri | |
| 4,967,463 A | 11/1990 | Pratt | |
| 4,985,979 A | 1/1991 | Speakman | 29/512 |
| 4,999,896 A | 3/1991 | Mangus et al. | 29/34 B |
| 5,025,128 A | 6/1991 | Derbyshire | |
| 5,038,596 A | 8/1991 | Noonan et al. | 72/391.4 |
| 5,006,179 A | 11/1991 | Pratt | |
| 5,069,586 A | 12/1991 | Casey | 411/339 |
| 5,083,363 A | 1/1992 | Ransom et al. | 29/523 |
| 5,093,957 A | 3/1992 | Do | 16/2 |
| 5,096,349 A | 3/1992 | Landy et al. | 411/108 |
| 5,103,548 A | 4/1992 | Reid et al. | 29/507 |
| 5,110,163 A | 5/1992 | Benson et al. | 285/382.2 |
| 5,123,792 A | 6/1992 | Strobel | |
| 5,127,254 A | 7/1992 | Copple et al. | 72/370 |
| 5,129,253 A * | 7/1992 | Austin et al. | 72/370.07 |

(56) References Cited

U.S. PATENT DOCUMENTS

| | | | |
|---|---|---|---|
| 5,178,502 A | 1/1993 | Sadri | |
| 5,207,461 A | 5/1993 | Lasko | 285/222 |
| 5,213,460 A | 5/1993 | Sadri et al. | |
| 5,218,854 A | 6/1993 | Jarzebowicz et al. | 72/370 |
| 5,238,342 A | 8/1993 | Stencel | |
| 5,245,743 A | 9/1993 | Landy et al. | 29/523 |
| 5,253,773 A | 10/1993 | Choma et al. | 230/86.2 |
| 5,256,017 A | 10/1993 | Smirnov et al. | |
| 5,305,627 A | 4/1994 | Quincey et al. | 72/370 |
| 5,341,559 A * | 8/1994 | Reid et al. | 29/523 |
| 5,350,266 A | 9/1994 | Espey et al. | |
| 5,380,111 A | 1/1995 | Westrom | 402/74 |
| 5,380,136 A | 1/1995 | Copple et al. | 411/183 |
| 5,390,808 A | 2/1995 | Choma et al. | 220/86.2 |
| 5,399,052 A | 3/1995 | Volkmann et al. | |
| 5,405,228 A | 4/1995 | Reid et al. | 411/183 |
| 5,433,100 A | 7/1995 | Easterbrook et al. | 72/391.2 |
| 5,466,016 A | 11/1995 | Briody et al. | 285/204 |
| 5,468,104 A | 11/1995 | Reid et al. | |
| 5,478,122 A | 12/1995 | Seabra | 285/281 |
| 5,496,140 A | 3/1996 | Gossmann et al. | |
| 5,498,110 A | 3/1996 | Stencel et al. | |
| 5,607,194 A | 3/1997 | Ridenour | 285/334.5 |
| 5,609,434 A | 3/1997 | Yehezkieli et al. | 403/260 |
| 5,632,582 A | 5/1997 | Gauron | |
| 5,634,751 A | 6/1997 | Stencel et al. | |
| 5,666,710 A | 9/1997 | Weber et al. | |
| 5,702,215 A | 12/1997 | Li | |
| 5,713,611 A | 2/1998 | Kurimoto et al. | 285/382.5 |
| 5,722,312 A | 3/1998 | Kristensen | 92/171.1 |
| 5,806,173 A | 9/1998 | Honma et al. | 29/727 |
| 5,813,808 A | 9/1998 | Wu | |
| 5,816,761 A | 10/1998 | Cassatt et al. | |
| 5,860,213 A | 1/1999 | Knudson | |
| 5,885,318 A | 3/1999 | Shimizu et al. | 65/493 |
| 5,943,898 A | 8/1999 | Kuo | 72/370.07 |
| 5,947,326 A | 9/1999 | O'Hern et al. | 220/802 |
| 5,947,667 A | 9/1999 | Cassatt et al. | |
| 6,036,418 A | 3/2000 | Stencel et al. | |
| 6,058,562 A | 5/2000 | Satou et al. | 16/2.1 |
| 6,077,009 A | 6/2000 | Hazelman | |
| 6,077,010 A | 6/2000 | Reid et al. | |
| 6,131,964 A | 10/2000 | Sareshwala | 285/382 |
| 6,183,180 B1 | 2/2001 | Copple et al. | |
| 6,217,082 B1 | 4/2001 | Orcutt et al. | 285/272 |
| 6,266,991 B1 | 7/2001 | Kuo | 72/370.07 |
| 6,289,577 B1 | 9/2001 | Tanaka et al. | 29/603.03 |
| 6,325,582 B1 | 12/2001 | Sadri et al. | |
| 6,328,513 B1 | 12/2001 | Niwa et al. | 411/339 |
| 6,347,663 B1 | 2/2002 | Hunzinger et al. | 165/178 |
| 6,487,767 B1 | 12/2002 | Reid et al. | |
| 6,488,460 B1 | 12/2002 | Smith et al. | 411/353 |
| 6,499,926 B2 | 12/2002 | Keener | 411/504 |
| 6,537,005 B1 | 3/2003 | Denham | |
| 6,623,048 B2 | 9/2003 | Castel et al. | 285/382 |
| 6,651,301 B1 | 11/2003 | Liu | 29/243.521 |
| 6,705,149 B2 | 3/2004 | Cobzaru et al. | 72/391.4 |
| 6,761,380 B2 | 7/2004 | Pachciarz et al. | 285/204 |
| 6,773,039 B2 | 8/2004 | Muenster et al. | 285/259 |
| 6,792,657 B2 | 9/2004 | Reid et al. | |
| 6,796,765 B2 | 9/2004 | Kosel et al. | 415/142 |
| 6,826,820 B2 | 12/2004 | Denham et al. | 29/524.1 |
| RE38,788 E | 9/2005 | Satou et al. | 16/2.1 |
| 6,990,722 B2 | 1/2006 | Reid et al. | |
| 7,024,908 B2 | 4/2006 | Poast et al. | 72/391.2 |
| 7,024,909 B2 | 4/2006 | Cobzaru et al. | |
| 7,047,596 B2 | 5/2006 | Sucic et al. | 16/2.1 |
| 7,059,816 B2 | 6/2006 | Toosky | 411/181 |
| 7,100,264 B2 | 9/2006 | Skinner et al. | 29/523 |
| 7,127,792 B2 | 10/2006 | Wakamori et al. | |
| 7,156,051 B2 | 1/2007 | Lorton et al. | |
| 7,273,338 B2 | 9/2007 | Summerlin | |
| 7,303,366 B2 | 12/2007 | Smith | |
| 7,325,796 B2 | 2/2008 | Moreland | |
| 7,375,277 B1 | 5/2008 | Skinner et al. | 174/18 |
| 7,406,777 B2 | 8/2008 | Grover et al. | 33/645 |
| 7,448,652 B2 | 11/2008 | Poast et al. | 285/136.1 |
| 7,509,829 B2 | 3/2009 | Johnson | |
| 7,575,404 B2 | 8/2009 | Toosky et al. | |
| 7,617,712 B2 | 11/2009 | Glenn | 72/391.4 |
| 7,641,430 B2 | 1/2010 | Johnson et al. | |
| 7,695,226 B2 | 4/2010 | March et al. | |
| 7,926,318 B2 | 4/2011 | Glenn | |
| 7,926,319 B2 | 4/2011 | Johnson | |
| 7,946,628 B2 | 5/2011 | Poast et al. | |
| 8,061,178 B2 | 11/2011 | Glenn | |
| 8,069,699 B2 | 12/2011 | Glenn et al. | |
| 8,117,885 B2 | 2/2012 | Glenn | |
| 8,191,395 B2 | 6/2012 | Glenn | |
| 8,297,897 B2 | 10/2012 | Auriol et al. | |
| 8,312,606 B2 | 11/2012 | Reid et al. | |
| 8,322,015 B2 | 12/2012 | Pratt et al. | |
| 8,348,566 B2 | 1/2013 | Pratt | |
| 8,353,193 B2 | 1/2013 | Johnson | |
| 8,387,436 B2 | 3/2013 | Glenn | |
| 8,402,806 B2 | 3/2013 | Glenn et al. | |
| 8,506,222 B2 | 8/2013 | Reid et al. | |
| 2003/0110618 A1 | 6/2003 | Magnuson | |
| 2004/0111864 A1 | 6/2004 | Skinner et al. | 29/523 |
| 2004/0213492 A1 | 10/2004 | Kim et al. | |
| 2005/0000081 A1 | 1/2005 | Reid et al. | |
| 2005/0005669 A1 | 1/2005 | Poast et al. | |
| 2005/0025601 A1 | 2/2005 | Poast et al. | |
| 2005/0262682 A1 | 12/2005 | Grover et al. | |
| 2006/0045649 A1 | 3/2006 | Johnson et al. | |
| 2006/0251490 A1 | 11/2006 | Kleinman et al. | |
| 2007/0048107 A1 | 3/2007 | Johnson et al. | |
| 2007/0110541 A1 | 5/2007 | Rawlins et al. | 411/54.1 |
| 2007/0224016 A1 | 9/2007 | Toosky et al. | |
| 2007/0266756 A1 | 11/2007 | Shuster et al. | |
| 2007/0289351 A1* | 12/2007 | Glenn | 72/370.07 |
| 2008/0005887 A1 | 1/2008 | Glenn et al. | 29/523 |
| 2008/0034831 A1 | 2/2008 | Glenn | 72/370.07 |
| 2008/0066518 A1 | 3/2008 | Glenn et al. | 72/370.07 |
| 2008/0250603 A1 | 10/2008 | Skinner et al. | 16/2.2 |
| 2009/0304315 A1 | 12/2009 | Johnson | |
| 2010/0000280 A1 | 1/2010 | Reid et al. | |
| 2010/0260572 A1 | 10/2010 | Wehrmeister et al. | |
| 2011/0150599 A1 | 6/2011 | Bakken et al. | |
| 2011/0182689 A1 | 7/2011 | Avetisian | |
| 2012/0304577 A1 | 12/2012 | Reid et al. | |
| 2012/0317787 A1 | 12/2012 | Ross et al. | |
| 2013/0192331 A1 | 8/2013 | Ross et al. | |
| 2013/0200543 A1 | 8/2013 | Ross et al. | |
| 2013/0204422 A1 | 8/2013 | Ross et al. | |
| 2013/0239399 A1 | 9/2013 | Reid et al. | |

FOREIGN PATENT DOCUMENTS

| | | |
|---|---|---|
| CN | 1846092 A | 10/2006 |
| DE | 2203217 | 7/1973 |
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0 248 122 A2 | 12/1987 |
| EP | 0581385 B1 | 5/1997 |
| EP | 0 785 366 A1 | 7/1997 |
| EP | 0643231 B1 | 12/1998 |
| EP | 0 891 007 A1 | 1/1999 |
| EP | 0696686 B1 | 7/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1061276 B1 | 9/2005 |
| EP | 1611976 A1 | 1/2006 |
| EP | 1624202 A2 | 2/2006 |
| EP | 1032769 B1 | 5/2006 |
| EP | 1779964 A1 | 5/2007 |
| EP | 1803526 A1 | 7/2007 |
| EP | 1 872 895 A2 | 1/2008 |
| EP | 1 903 221 A2 | 3/2008 |

(56) References Cited

FOREIGN PATENT DOCUMENTS

| | | |
|---|---|---|
| EP | 1751432 B1 | 7/2008 |
| EP | 1893875 B1 | 3/2011 |
| EP | 1280621 B1 | 10/2011 |
| EP | 2388104 A1 | 11/2011 |
| EP | 2019739 B1 | 12/2011 |
| EP | 1644142 B1 | 10/2012 |
| EP | 2568183 A2 | 3/2013 |
| EP | 2061626 B1 | 4/2013 |
| EP | 1651365 B1 | 6/2013 |
| FR | 2645052 | 10/1990 |
| GB | 593607 | 10/1947 |
| GB | 1395009 | 5/1975 |
| GB | 2 239 917 A | 7/1991 |
| JP | 57137031 | 8/1982 |
| JP | 60238046 A | 11/1985 |
| JP | 61157846 | 7/1986 |
| JP | 09-072097 | 3/1997 |
| JP | 9-99334 A | 4/1997 |
| JP | 10-274366 | 10/1998 |
| JP | 10-299735 | 11/1998 |
| JP | 2001-177964 | 6/2001 |
| JP | 2004-176254 | 6/2004 |
| JP | 2007-500828 A | 1/2007 |
| JP | 2009-535218 A | 10/2009 |
| JP | 2009-535577 A | 10/2009 |
| JP | 2011-513672 A | 4/2011 |
| KR | 10-2009-0064401 A | 6/2009 |
| SU | 632463 | 11/1978 |
| WO | 8400120 A1 | 1/1984 |
| WO | 1987/01418 | 3/1987 |
| WO | 91/11273 A1 | 8/1991 |
| WO | 1999/27262 A1 | 6/1999 |
| WO | 00 28221 A2 | 5/2000 |
| WO | WO02059489 A1 | 8/2002 |
| WO | 2006/026413 A1 | 3/2006 |
| WO | 2006132936 A1 | 12/2006 |
| WO | 2007082077 A1 | 7/2007 |
| WO | 2007121932 A1 | 11/2007 |
| WO | 2008/144440 A2 | 11/2008 |
| WO | 2009/052325 A1 | 4/2009 |
| WO | 2009/111745 A2 | 9/2009 |
| WO | 2010/009442 A2 | 1/2010 |
| WO | 2010/118366 A1 | 10/2010 |
| WO | 2011/084624 A2 | 7/2011 |
| WO | 2012/167136 A2 | 12/2012 |
| WO | 2012/174215 A2 | 12/2012 |
| WO | 2013/116111 A1 | 8/2013 |

OTHER PUBLICATIONS

Callinan et al., "Analysis of Fatigue Crack Growth from Cold-expanded/interference Fitted Stop Drilled Holes," DSTO-TR-0704, Airframes and Engines Division, Aeronautical and Maritime Research Laboratory, Melbourne, Australia, Jul. 1998, 39 pages.

Communication pursuant to Article 94(3) EPC, dated May 4, 2016, for European Application No. 09 718 324.8-1702, 4 pages.

\* cited by examiner

EXPANDABLE MEMBER WITH WAVE INHIBITOR AND METHODS OF USING THE SAME

CROSS-REFERENCE TO RELATED APPLICATION

This application claims the benefit under 35 U.S.C. § 119(e) of U.S. Provisional Patent Application No. 61/034,843 filed Mar. 7, 2008. This provisional application is incorporated herein by reference in its entirety.

BACKGROUND

Field of the Disclosure

This disclosure generally relates to expandable members with at least one wave inhibitor and methods of using the same.

Description of the Related Art

Members are installed in openings of workpieces for a variety of reasons, including improving fatigue performance, reinforcement, and installing components. One method of installing a member in the form of a bushing is the FORCEMATE® installation process developed by Fatigue Technology, Inc. The FORCEMATE® installation process is especially suitable for assemblies that will undergo repetitive load cycles and/or may be susceptible to accumulating fatigue damage. Various types of other installation processes can also be used to install bushings.

When a hole is cold expanded or a bushing is installed using the cold expansion method of drawing a tapered mandrel into and through the inner diameter (ID) of the bushing, the majority of material is displaced radially. However, a portion of material is also displaced longitudinally, in-line with the axis of the bushing and just ahead of the mandrel. The amount of material that is displaced longitudinally and the extent to which it is displaced is dependent on many factors including, for example, the thickness of the receiving structure, length of the bushing, the applied expansion, the mandrel taper angle, etc. As the mandrel travels along the length of the hole, the longitudinally displaced material ahead of the mandrel tends to accumulate. As the mandrel nears the exit end of the hole, this material often tends to dissipate in one of two ways. If the cold expansion tooling is configured such that the exit end of the hole or bushing is not constrained, the accumulated material often results in deformation at the exit surface of the bushing or exaggerated extrusion of the bushing. If the cold expansion tooling is configured such that the exit end of the hole or bushing is constrained (e.g., the exit end is in contact with the front of installation tooling), the accumulated material often results in exaggerated radial expansion near or at the exit end of the assembly and may also result in locally increased interference between the mandrel and the hole or the bushing and the receiving structure at the exit end as compared to the interference at the entry end of the assembly. A combination of both radial and axial deformation will often result. Whether resulting in deformation, exaggerated bushing growth, or imbalanced interference from end to end, the longitudinally displaced wave of material associated with a traditional cold expansion or bushing installation may be problematic for several reasons. The wave of material may cause over expansion of the exit side of the workpiece, resulting in unwanted crack initiation, crack growth, shear tears (e.g., shear tears emanating from an edge of the hole in which the bushing is installed), and other failure mechanisms associated with high strains, especially if the expansion exceeds the elongation properties of the workpiece. Accordingly, waves of material formed during expansion processes often decrease fatigue performance, load bearing capabilities, and the like.

When a hole of a workpiece is radially expanded, beneficial residual stresses may be induced in a region of the workpiece about the hole. Increased applied expansion at the exit end of the workpiece, attributable to the wave effect during cold expansion or bushing installation, will often move both a zone of material in compression and a balancing zone of material in tension that is positioned radially away from the edge of the hole. This may result in material in tension proximate to features where tension is undesirable, such as the outer edge of a highly loaded lug.

Installation of a bushing may also produce upset or distorted material at the exit side of the bushing because of the wave of material generating a bi-axial stress distribution in the workpiece along the length of the hole in which the bushing is installed. Bi-axial stress distributions often cause workpiece material at the exit side of the bushing to deform and bulge outwardly and, in some cases, may cause a "volcano" effect. It may be difficult to incorporate a workpiece with bulging surfaces into a load transfer joint because the bulging surfaces may separate faying surfaces in the joint.

If numerous bushings are installed in a parent component, localized deformations in the parent component may produce considerable overall distortion of the parent component. Cupping of regions of the parent component (e.g., an attachment lug or fitting) surrounding the bushings, cupping of bushing flanges (e.g., flanges at exit sides of bushings), or combinations thereof may be the result of a non-uniform stress state through the thicknesses of the parent component and/or bushing. A stress concentration in the workpiece at the exit side of the bushing often results in an outwardly bulging workpiece surface that causes cupping of a bushing flange.

When expanding a bushing into a composite material, a steady increase in applied expansion caused by displaced material building in front of a mandrel and the bi-axial strain induced by the bushing are often detrimental to the surrounding composite material. Non-uniform expansion and bi-axial strain, alone or in combination, often result in localized over expansion, delamination, and damage (e.g., micro-cracking) within the composite sub-structure.

The longitudinal length of a bushing may increase during the installation process such that an exit end of the bushing protrudes outwardly from the workpiece. For example, bushings that have relatively thick walls are well suited for achieving high retention forces. Unfortunately, extremely high axial forces are used to radially expand such thick-walled bushings. These forces, necessary for proper radial expansion, often result in significant lengthening of the bushing, as well as a significant amount of bushing material upset. Additionally, extrusion or growth of the bushing may not be uniform across a non-flanged end of the bushing where, for example, a majority of the growth occurs in a region adjacent to an inner surface of the bushing.

BRIEF SUMMARY

Some embodiments include a member adapted to prevent, diminish, limit, or substantially eliminate a traveling wave of material before the traveling wave reaches an exit side of the member and/or workpiece in which the member is installed. In some embodiments, the member has a transverse cross-sectional area that varies along at least a portion of its longitudinal length such that drawn material ahead of an expansion mandrel is inhibited by the portion of the member with the varying cross-sectional area. In some embodiments, the transverse cross-sectional area at or near an exit end of the member, i.e., the end at which the mandrel exits, can be decreased to minimize, limit, or substantially eliminate unwanted conditions (e.g., distortions or material upset of the workpiece, excessively high strains in the workpiece, lengthening of the member, and the like) caused, at least in part, by the wave of material.

In some embodiments, a section of an expandable member for expanding a hole of a workpiece has a profile that gradually decreases along an entire longitudinal length of the member or along only a portion of the longitudinal length. The profile can gradually decrease towards an exit end of the member such that an amount of displaced material of the member pushed ahead of an expandable mandrel is minimized or substantially eliminated during the installation process. The profile can also be selected to control expansion throughout the thickness of the workpiece. For example, the profile can be selected to achieve a general uniform residual stress zone between the entry and exit sides of the workpiece while avoiding excessively high residual stresses (e.g., compressive or tensile stresses) that may damage the workpiece.

In some embodiments, an expandable member includes a wave inhibitor dimensioned to accommodate a substantial portion or most of a wave of displaced material moving ahead of an expansion mandrel during radial expansion of the member. As used herein, the term "wave" is broadly construed to include, without limitation, a moving mass of material. When a member is radially expanded, it is compressed between a workpiece and a mandrel. The compression causes displacement of member material that moves away from the region of compression along a longitudinal axis of the member. The wave inhibitor, for example, can accommodate a sufficient amount of the wave such that a substantially uniform stress field is produced in a portion of the workpiece surrounding an opening in which the expandable member is installed.

The differences between residual stresses induced in the workpiece at a mandrel entry side and at a mandrel exit side can be minimized, limited, or substantially eliminated, thereby preventing or alleviating cracking (e.g., local surface cracking), tears (e.g., shear tears), and other types of damage often produces at an exit side using traditional techniques. Additionally, the expandable member can be installed without a significant amount of localized surface bulging and/or distortion (local or overall) of the workpiece.

In some embodiments, an expandable member for installation in an opening of a workpiece is provided. The expandable member comprises a member body having a first end, a second end opposite the first end, and a sidewall extending between the first end and the second end and defining a longitudinal passageway. The sidewall includes a longitudinally tapered section adjacent to the second end. The tapered section is dimensioned to accommodate displaced material of the member body moving along a longitudinal axis of the member body away from the first end towards the second end when an expansion mandrel moves through the longitudinal passageway to install the member in the opening. The tapered section is adapted to radially expand the workpiece while accommodating the displaced material so as to substantially prevent stress concentrations associated with the displaced material in a portion of the workpiece radially adjacent to the second end of the member body.

In some embodiments, a member installation includes a workpiece and a member. The workpiece includes a first opening, a second opening, and a hole extending between the first and second openings. The member is within the hole of the workpiece. The member has a first end, a second end, and a member body extending between the first end and the second end. The member body defines a longitudinal passageway. The member body further includes a wave inhibitor that has been radially expanded by an expansion mandrel so as to fix the member to the workpiece after the wave inhibitor at least diminishes an amount of material in a wave of material ahead of an expansion portion of the expansion mandrel such that a first stress state in a first portion of the workpiece surrounding the first opening is approximately equal to a second stress state in a second portion of the workpiece surrounding the second opening. The wave of material includes longitudinally displaced material of the member.

In some embodiments, a system includes a mandrel and an expandable member. The mandrel is coupleable to an installation tool and includes an expansion section. The expandable member includes a first end, a second end opposite the first end, and a tubular main body extending between the first end and the second end. The tubular main body defines a longitudinal passageway sized to receive the mandrel. The main body includes a tapered section adjacent to the second end. The tapered section is dimensioned to accommodate displaced material of the main body pushed along a longitudinal axis of the member by the expansion section of the mandrel moving along the passageway prior to the expansion section of the mandrel fully expanding the tapered section such that the displaced material and the tapered section are expanded together.

In some embodiments, a method of installing a member into a workpiece is provided. The method includes positioning a member in an opening of a workpiece. The member has a first end, a second end, and a tubular body extending between the first end and the second end. An expansion mandrel is moved through a passageway of the tubular body. The member is radially expanded causing longitudinally displaced material resulting from compression of the member such that the displaced material moves along a longitudinal axis of the member towards a tapered section of the member that accommodates the displaced material so as to prevent stress concentrations attributable to the displaced material in a region of the workpiece surrounding the second end of the member as both the tapered section and the displaced material expand into the region of the workpiece to form an interference fit or to cold expand the opening to induce fatigue enhancing stresses in the workpiece. In some embodiments, the displaced material is expanded into the region of the workpiece to both form the interference fit and cold expand the opening to induce fatigue enhancing stresses.

In certain embodiments, a radially expanded member can be removed from an opening to induce fatigue enhancing stresses in a workpiece without permanently installing the expanded member. Removing the radially expanded member from the opening may include allowing the radially expanded member to contract inwardly to provide a clearance fit between the member and a hole in the workpiece. The radially expanded member may contract as the mandrel is pulled out of the member.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. The shapes of various elements and angles may not be drawn to scale, and some of these elements may be arbitrarily enlarged and positioned to improve drawing legibility.

DETAILED DESCRIPTION

In the following description, certain specific details are set forth in order to provide a thorough understanding of various disclosed embodiments. However, one skilled in the art will understand that the disclosed embodiments may be practiced without these details.

Unless the context requires otherwise, throughout the specification and claims which follow, the word "comprise" and variations thereof, such as, "comprises" and "comprising" are to be construed in an open, inclusive sense, that is as "including, but not limited to." It should also be noted that the term "or" is generally employed in its sense including "and/or" unless the context clearly dictates otherwise.

The headings provided herein are for convenience only and do not interpret the scope or meaning of the claimed embodiments. The following description relates to, without limitation, expandable members, wave inhibitors, expansion mandrels, and installation systems. The terms "proximal" and "distal" are used to describe the illustrated embodiments and are used consistently with the description of non-limiting exemplary applications. The terms proximal and distal are used in reference to the user's body when the user operates an installation tool, unless the context clearly indicates otherwise.

Generally, an expandable member for installation in a workpiece can have at least one wave inhibitor for reducing, limiting, or substantially eliminating a traveling wave of material formed during the installation process. The wave inhibitor can be a section of the member having a profile with a gradually decreasing outer dimension, inner dimension, or both. When the member is expanded, the wave inhibitor can both expand an adjacent region of a workpiece and control the wave of material.

The wave inhibitor can extend along an entire longitudinal length of the member or along only a section of the longitudinal length. The wave inhibitor promotes substantially uniform radial expansion through the thickness of the workpiece, and in some embodiments, a resultant residual stress zone may be somewhat uniform from an entry side to an exit side of the member. Residual compressive stresses or residual tensile stresses in the workpiece can be kept at or below a desired level to, for example, avoid exceeding a yield strength of the workpiece material, as well as to decrease or substantially eliminate surface upset, localized distortions, or overall distortion of the workpiece.

If the workpiece is made of a composite material, excessive interlaminar shear stresses in the composite matrix, through the bore of the hole, that are caused by the wave effect during expansion can be controlled to reduce the occurrence of sub-surface or surface delamination. Delamination may or may not be detectable (e.g., visually detectable) and may lead to premature failure of the assembly. The expandable members disclosed herein may be installed without causing delamination often associated with traditional members.

Figure 1:
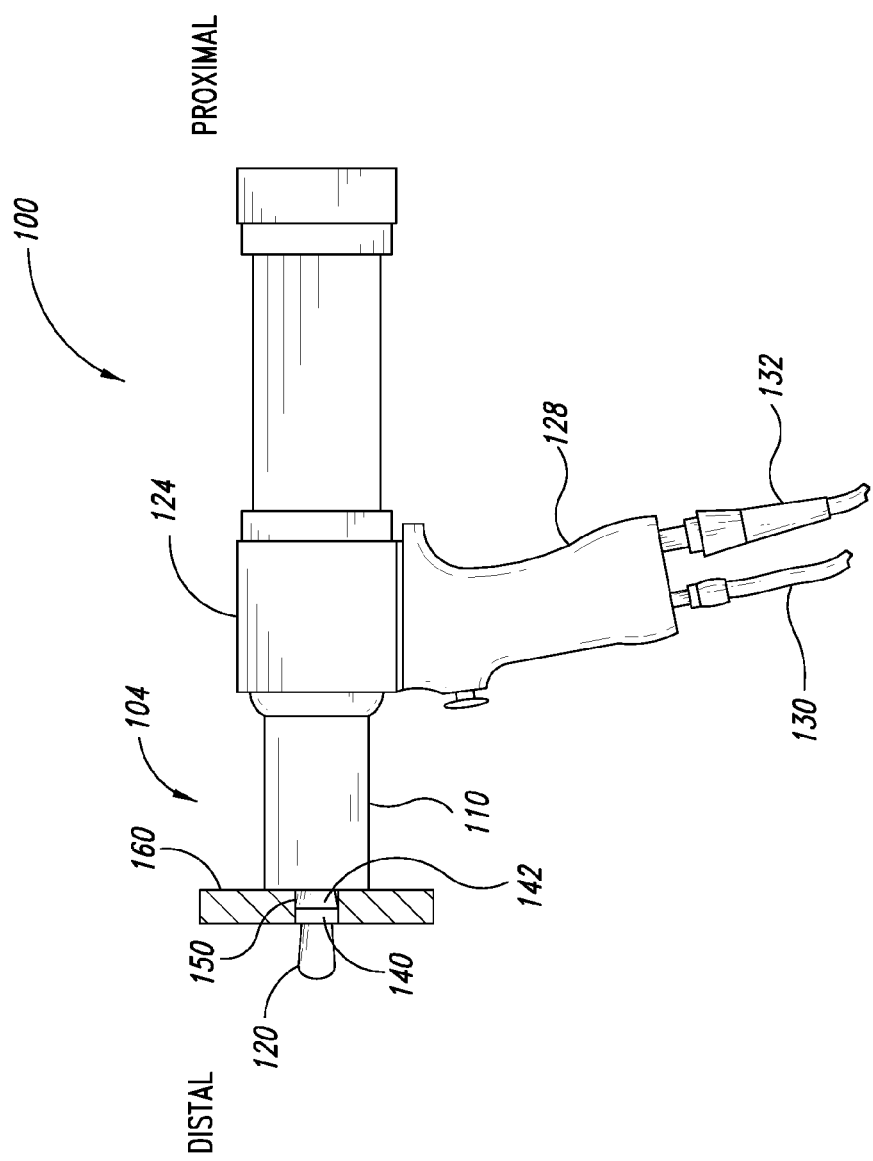
FIG. 1 is a side elevational view of an installation system having an expansion mandrel attached to an installation tool and a pre-installed expandable member positioned on the mandrel, according to one illustrated embodiment.
Figure 2:
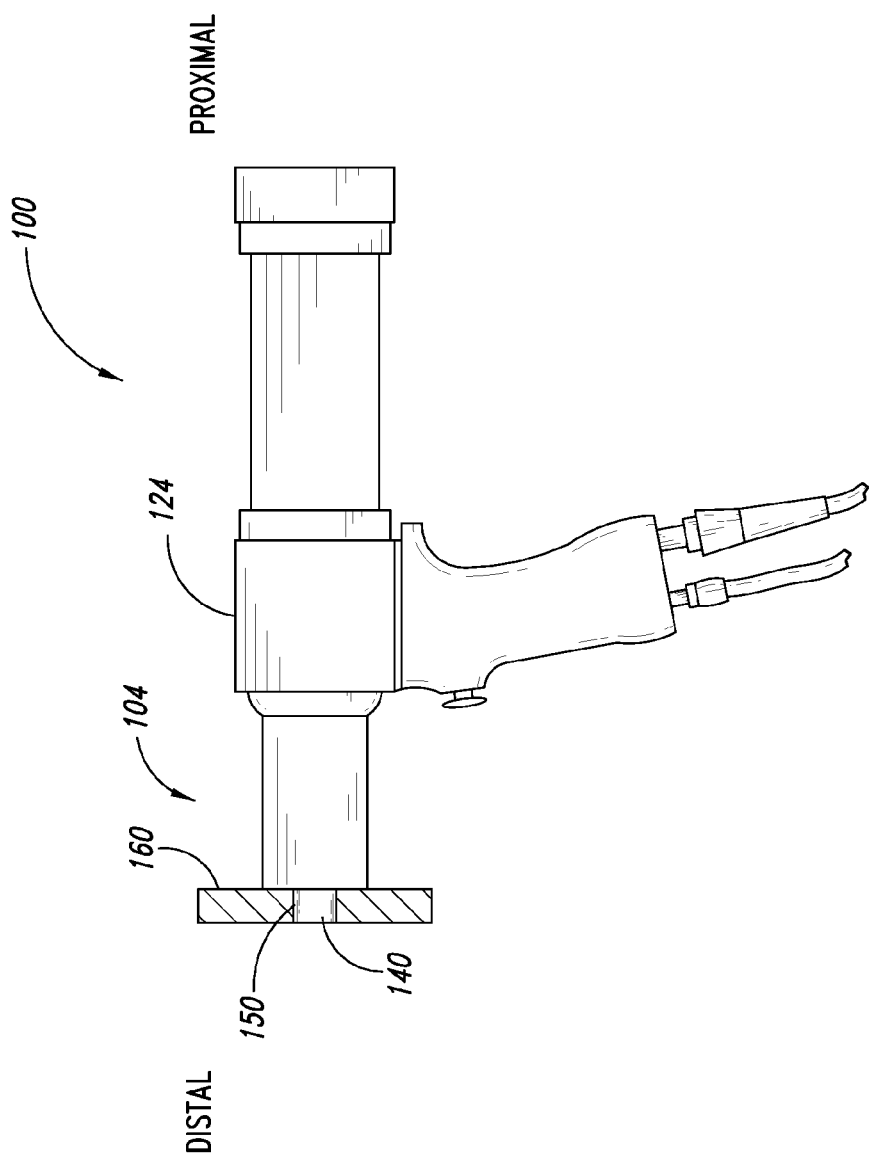
FIG. 2 is a side elevational view of the installation system of FIG. 1 after the member is installed.

FIG. 1 shows an installation system 100 including an installation tool 104, a nose cap assembly 110 coupled to the installation tool 104, and an expansion mandrel 120 extending outwardly from the nose cap assembly 110 through an expandable member 140. Generally, the installation system 100 is used to install the expandable member 140 within a hole 150 (illustrated as a through-hole) in a workpiece 160 (shown in cross-section). The installation tool 104 pulls the mandrel 120 through the member 140 such that the mandrel 120 radially expands the member 140 into the workpiece 160. FIG. 2 shows the post-expanded member 140 that resulted in a generally uniform amount of expansion along the entire length of the hole 150.

The illustrated member 140 of FIG. 1 includes a wave inhibitor in the form of a tapered section 142 dimensioned and adapted to control a wide range of effects attributable to a wave of extruded material that is formed as the mandrel 120 expands the member 140. When the mandrel 120 moves through the member 140, the tapered section 142 moves outwardly against the workpiece 160 to induce residual stresses in the material of the workpiece 160 about the exit side of the hole 150. The residual stresses can be beneficial compressive stresses that improve performance by, for example, extending the fatigue and damage tolerance life of the workpiece 160.

With continued reference to FIG. 1, the installation tool 104 includes a main body 124 that is coupled to a grip 128. A user can manually grasp the grip 128 for comfortably holding and accurately positioning the installation system 100. The illustrated grip 128 is a pistol grip. However, other types of grips can be utilized.

The installation tool 104 can be driven electrically, hydraulically, pneumatically, or by any other suitable drive system. In some embodiments, the main body 124 houses a drive system capable of driving the mandrel 120, preferably along a predetermined path (e.g., a line of action), in a proximal direction and/or distal direction. A pair of fluid lines 130, 132 provides pressurized fluid (e.g., pressurized gas, liquid, or combinations thereof) to a piston drive system that actuates the mandrel 120. One of ordinary skill in the art can select the type of drive system used to achieve the desired motion of the mandrel 120.

The mandrel 120 comprises an elongated body configured to radially expand the member 140 when the mandrel 120 is moved axially through a passageway in the member 140. As used herein, the term "mandrel" is a broad term and includes, but is not limited to, an elongated component having at least one tapered portion or expansion portion used to expand a member. In some embodiments, a gradually tapered portion of a mandrel can be used to radially expands an expandable member so as to produce an interference fit between the expandable member and a workpiece. Mandrels can have a one-piece or multi-piece construction. In some embodiments, the mandrel 120 has a monolithically formed body. In other embodiments, the mandrel 120 has a multi-piece construction. For example, the mandrel 120 can be a split mandrel.

As used herein, the term "member" includes, but is not limited to, a bushing (including a one-piece or multi-piece bushing), liner, tube, sleeve (including a split sleeve), fastener, structural expandable fastener (e.g., an expandable fastener that is incorporated into a structural workpiece), and other structures that are suitable for coupling to a workpiece. An expandable member can be expanded from a first configuration to a second configuration. In some embodiments, for example, the expandable member 140 is a bushing that can be radially expanded in order to form an interference fit with the illustrated through-hole 150. The term expandable member refers to a member in a pre-expanded state and a post-expanded state, unless the context clearly dictates otherwise. Various types of expansion processes can be employed to expand expandable members. In a cold expansion process, for example, the expandable member 140 is radially expanded without appreciably raising its temperature to produce residual stresses in the workpiece 160 and/or expandable member 140 to enhance fatigue performance. The residual stresses are preferably compressive stresses that can minimize, limit, inhibit, or prevent crack initiation and/or crack propagation.

The expandable member 140 of FIG. 1 can be installed in various types of workpieces. As used herein, the term "workpiece" is broadly construed to include, without limitation, a parent structure having at least one opening suitable for receiving an expandable member. The opening can be a through-hole, blind hole, or other type of opening. In some embodiments, the expandable member can be installed in a structural workpiece, such as a bulkhead, fuselage, engine, or other structural component of an aircraft. The expandable members can also be installed in other transportation vehicles (e.g., automobiles, trains, watercraft, and the like), rails such as railroad track rails, medical devices (e.g., implants), bridges (e.g., suspension bridges, beam bridges, truss bridges, etc.), and the like. The workpiece 160 of FIGS. 1 and 2 preferably has sufficient mechanical properties such that the installation system 100 can install the expandable member 140 while the member 140 is positioned within the hole 150. The user may or may not have backside access to the workpiece 160.

Figure 3:
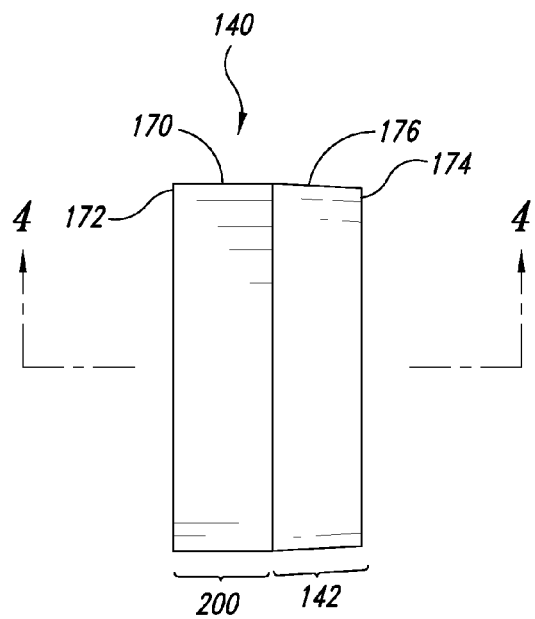
FIG. 3 is a side elevational view of an expandable member, according to one illustrated embodiment.
Figure 4:
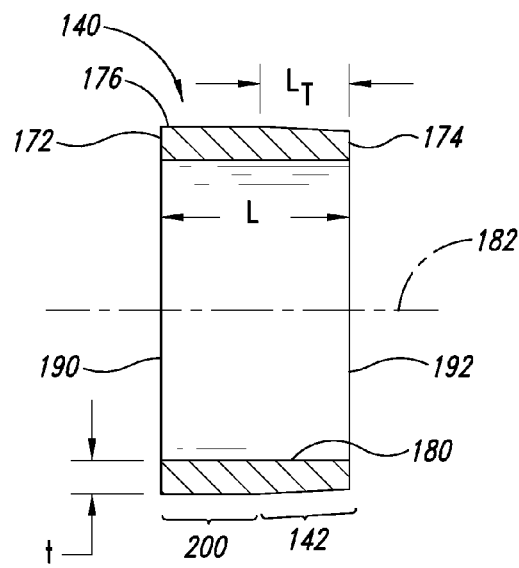
FIG. 4 is a cross-sectional view of the expandable member of FIG. 3 taken along line 4-4.
Figure 5:
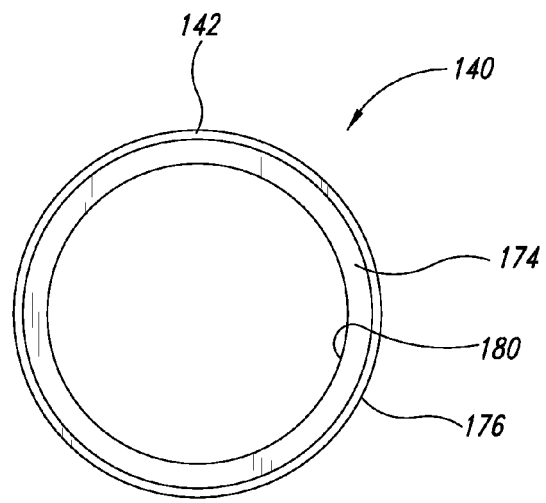
FIG. 5 is a front elevational view of the expandable member of FIG. 3.

FIGS. 3-5 show the expandable member 140 including a tubular body 170 having a first end 172, a second end 174 opposite the first end 172, and a sidewall 176 extending between the first and second ends 172, 174. The sidewall 176 includes the tapered section 142 adjacent to the second end 174 and defines a longitudinally-extending passageway 180 that extends generally along a longitudinal axis 182 of the member 140. The first and second ends 172, 174 define first and second openings 190, 192, respectively, at opposing ends of the passageway 180.

The sidewall 176 of FIG. 4 has a varying transverse cross-sectional area along the longitudinal axis 182. The transverse cross-sectional area normal to the longitudinal axis 182 can be selected based on one or more characteristics of the wave of material generated during the expansion process. The illustrated sidewall 176 includes a non-tapered section 200 between the first end 172 and the tapered section 142.

The section 200 is a relatively thick section of the sidewall 176, and the tapered section 142 is a narrowed section of the sidewall 176. The tapered section 142 has an average transverse cross-sectional area along its longitudinal length that is less than or equal to an average cross-sectional area of the section 200. As shown in FIG. 4, the wall thickness of the tapered section 142 gradually decreases from the section 200 to the second end 174.

Referring to FIG. 5, the sidewall 176 has a generally circular profile, and the expandable member 140 can therefore be installed in the workpiece hole 150 having a somewhat similar circular profile. In other embodiments, the tubular sidewall 176 can have a generally elliptical cross-sectional profile, polygonal cross-sectional profile (including rounded polygonal), or combinations thereof. In some embodiments, the sidewall 176 and passageway 180 both have generally elliptical shapes. The dimensions, shape, and configuration of the sidewall 176 can be selected based on the installation process to be performed.

Figure 6:
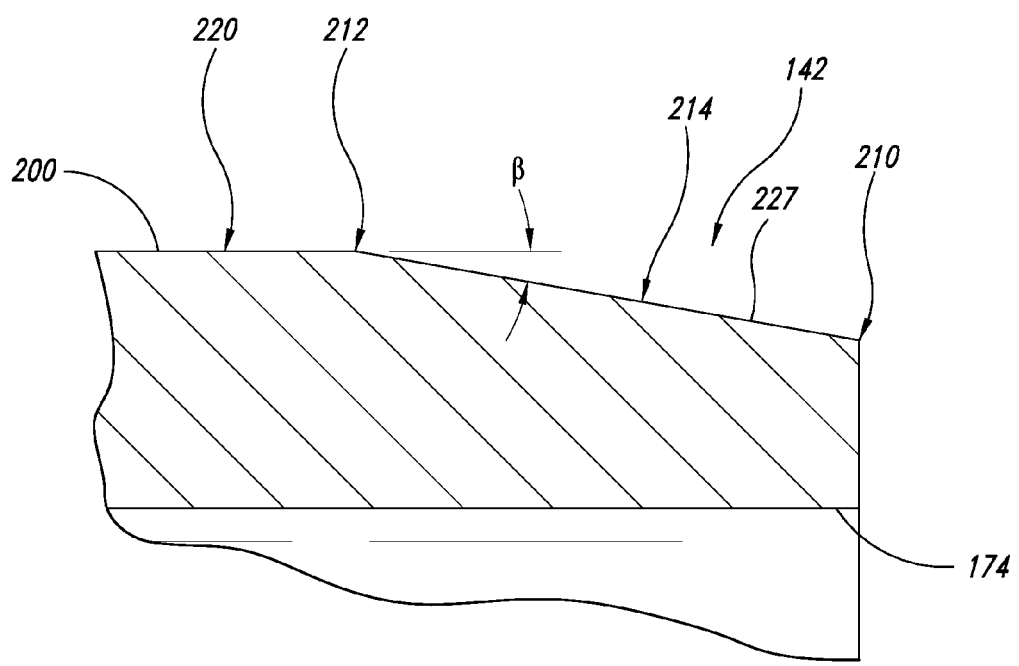
FIG. 6 is a detailed cross-sectional view of a tapered section of an expandable member, according to one illustrated embodiment.

FIG. 6 depicts the tapered section 142 that defines an angle of taper β and includes a minimum outer dimension 210, a maximum outer dimension 212, and a transition outer dimension 214 extending therebetween. The maximum outer dimension 212 is at least slightly larger than the minimum outer dimension 210. As used herein, the term "outer dimension" can include, but is not limited to, a circumference, perimeter, diameter, and other measurable lengths, widths, or areas.

The illustrated transition outer dimension 214 of FIG. 6 gradually decreases from the maximum outer dimension 212 to the minimum outer dimension 210. The maximum outer dimension 212 can be approximately equal to an outer dimension 220 of the section 200. The outer dimension 220 can be generally uniform along the axial length of the section 200. In other embodiments, the section 200 can have a variable outer dimension to, for example, accommodate holes in workpieces with varying diameters.

With continued reference to FIG. 6, the tapered section 142 has a generally frusto-conical outer surface 227. In other embodiments, the tapered section 142 has a longitudinally curved outer surface 227. The shape of the outer surface 227 can be selected based on the angle of taper β, length $L_T$ of the tapered section 142 (FIG. 4), or other parameters that may affect the installation process. The angle of taper β can be selected based on one or more properties of the wave of material formed during installation and the length $L_T$ of the tapered section 142. In some embodiments, the angle of taper β is equal to or less than about 30 degrees, 20 degrees, 10 degrees, 5 degrees, or 3 degrees, or ranges encompassing such angles. In some embodiments, including the illustrated embodiment of FIG. 4, the length $L_T$ of the tapered section 142 is less than half of a longitudinal length L of the member 140, and the angle of taper β is less than about 10 degrees. Such an embodiment is especially well suited for cancelling at least a substantial portion of the wave. In some embodiments, the length $L_T$ of the tapered section 142 is greater than a thickness t of the section 200 such that high retention forces can be achieved between the section 200 and the workpiece 160, while the tapered section 142 is sufficiently long to substantially eliminate the wave of drawn material. In some embodiments, the length $L_T$ of the tapered section 142 is at least 150%, 200%, or 300% of the wall thickness t of the section 200.

The expandable member 140 of FIGS. 3-6 can be formed, in whole or in part, of one or more metals (e.g., steel, aluminum, brass, combinations thereof), metal alloys, and the like. Other materials can also be employed, if needed or desired.

FIGS. 7-10 show one method of installing the expandable member 140. Generally, the expandable member 140 can be positioned in the hole 150 of the workpiece 160. The expansion mandrel 120 can be positioned along the passageway 180 and moved proximally to cause a wave of displaced material ahead of or adjacent to a tapered section of the expansion mandrel 120, which radially expands both the expandable member 140 and a region of the workpiece 160 surrounding the expandable member 140. As the expansion mandrel 120 moves from an entry side towards the exit side of the workpiece 160, the size of the wave is reduced by the tapered section 142 to at least reduce the effects at the exit side of the installation attributable to the wave.

Figure 7:
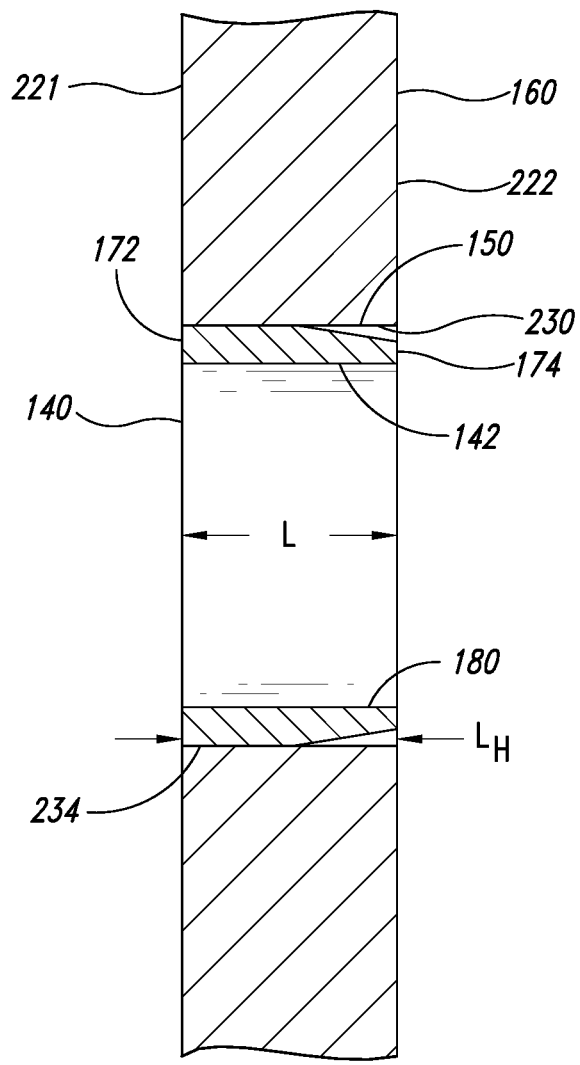
FIG. 7 is a cross-sectional view of an expandable member positioned in a hole of a workpiece before the member has been radially expanded, according to one illustrated embodiment.

Referring to FIG. 7, the expandable member 140 is ready to be expanded into the workpiece 160. The first end 172 of the expandable member 140 can be generally flush with or slightly offset from a first side 221 of the workpiece 160. The second end 174 of the expandable member 140 can be generally flush with or offset from a second side 222 of the workpiece 160. The illustrated first and second ends 172, 174 of FIG. 7 are generally flush with outer surfaces of the first and second sides 221, 222, illustrated as entry and exit sides, respectively. A longitudinal length L of the member 140 is approximately equal to a longitudinal length $L_H$ of the hole 150.

The expansion mandrel 120 can be inserted into and through the expandable member 140 of FIG. 7 and coupled to the installation tool 104. A clearance fit can be provided between an outer surface 234 of the expandable member 140 and the inner surface 230 of the workpiece 160 such that the expandable member 140 and mandrel 120 can be conveniently repositioned any number of times with respect to the workpiece 160.

Figure 8:
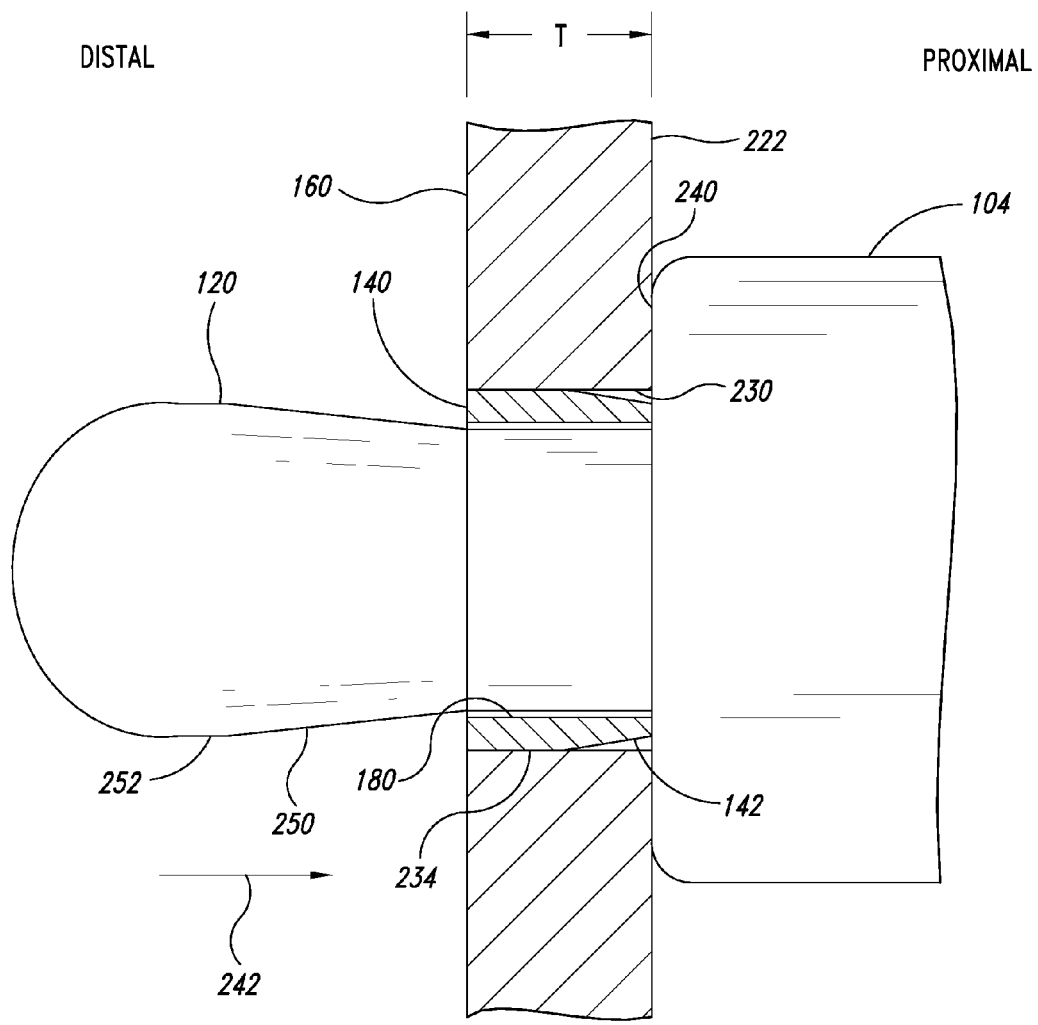
FIG. 8 is a side elevational view of an expansion mandrel positioned through an expandable member before the member has been radially expanded, according to one illustrated embodiment.

FIG. 8 illustrates the expansion mandrel 120 ready to expand and install the expandable member 140. A front surface 240 of the installation tool 104 can bear against the second side 222 of the workpiece 160. The installation tool 104 pulls the mandrel 120 proximally, as indicated by the arrow 242, through the passageway 180 of the expandable member 140 such that an expansion section 250 of the mandrel 120 radially expands the entry side of the member 140 into the workpiece 160, thereby producing a wave of material ahead of the expansion section 250.

The expansion section 250, illustrated as a tapered section, continues to expand the expandable member 140 and pushes the wave of displaced material away form the first end 172 towards the second side 222. In this manner, the wave 260 (FIGS. 9 and 9A) can move along the longitudinal axis 182 of the member 140. The wave 260 can be formed of displaced material from both the member 140 and workpiece 160. For example, FIGS. 9 and 9A shows the expansion section 250 radially expanding the non-tapered section 200 of the expandable member 140 such that a portion of the volume of the radially expanded member and workpiece material is displaced ahead of the point of maximum contact between the sidewall 176, the inner surface 230, and the expansion section 250.

Figure 9:
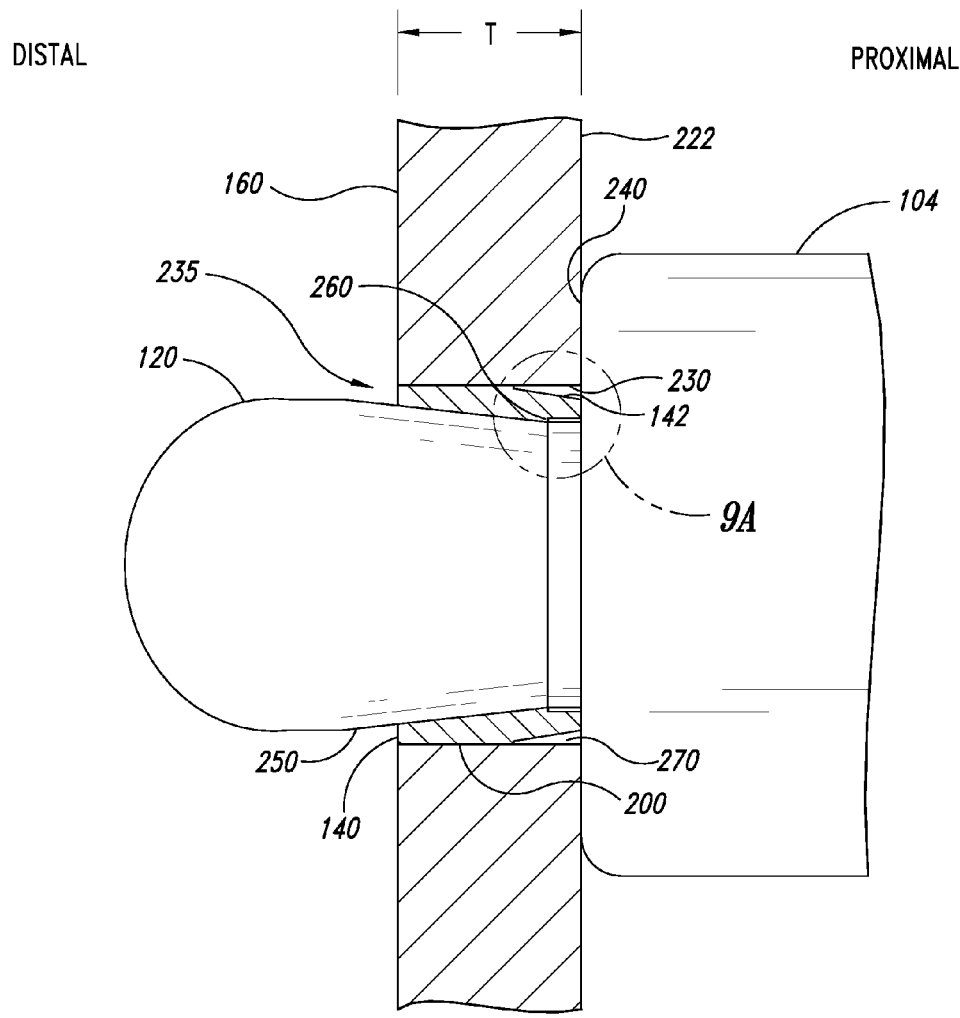
FIG. 9 is a side elevational view of the expansion mandrel radially expanding a portion of the member, according to one illustrated embodiment.
Figure 9A:
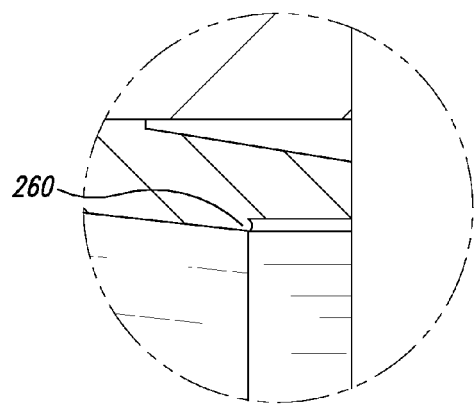
FIG. 9A is a detailed view of the expansion mandrel radially expanding a portion of the member.

Of course, the taper of the expansion section 250 can be shallower than the taper illustrated in FIG. 9. Additionally, the wave effect may primarily occur at the interface of outer diameter the expandable member 140 and the inner surface 230, especially if the expandable member 140 is made, in whole or in part, of a material that is harder than the material of the workpiece 160. In some embodiments, a significant portion of the wave is formed by workpiece material at the interface of the member 140 and the workpiece 160.

As the expansion section 250 in FIG. 9 is pulled towards the installation tool 104, the wave of displaced material 260 moves towards the installation tool 104. Once the wave 260 reaches the tapered section 142, the amount of material in the wave 260 can be reduced as the expansion section 250 moves the tapered section 142 into contact with the inner surface 230 of the workpiece 160 so as to close a gap 270. The tapered section 142 is further radially expanded to form an interference fit with the workpiece 160 to minimize, limit, or substantially prevent unwanted movement of the expandable member 140 relative to the workpiece 160. In this manner, an interference fit may be produced along the entire axial length L of the expandable member 140 in the hole 150.

Figure 10:
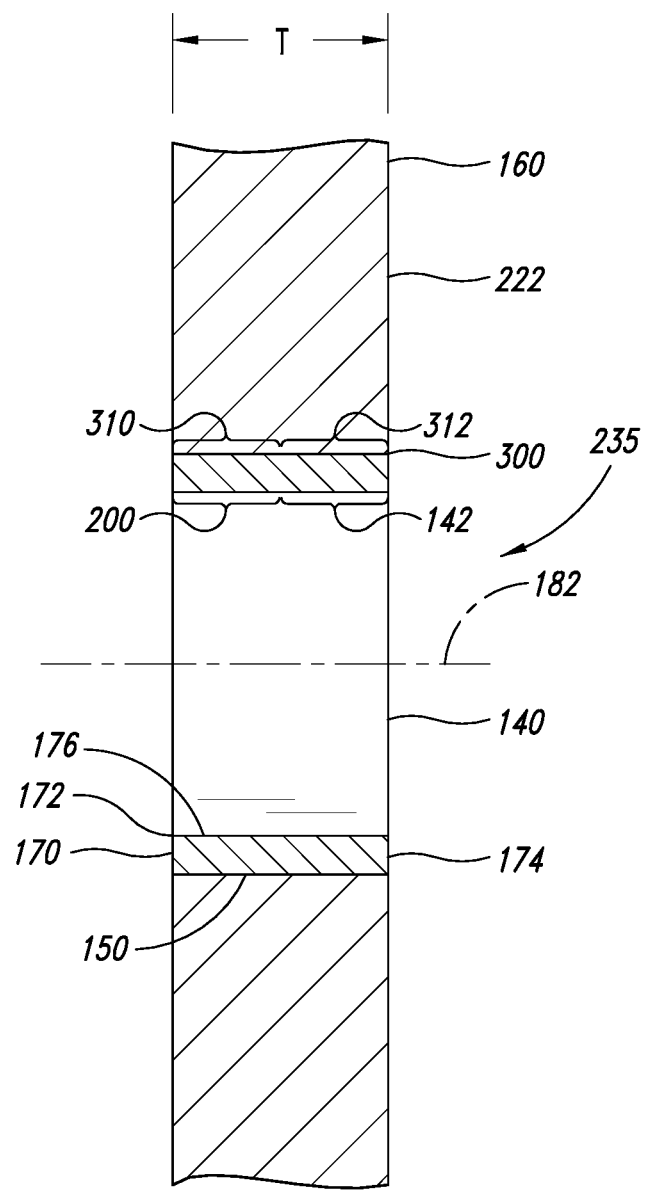
FIG. 10 is a cross-sectional view of the expandable member and workpiece of FIG. 7 after the member has been radially expanded, according to one illustrated embodiment.

After the mandrel 120 moves out of the second end 174 of the expandable member 140, the installation tool 104 and the mandrel 120 can be removed from the installation 235 (shown in FIG. 10). The sidewall 176 of the post-installed member 140 can have substantially uniform dimensions (e.g., inner dimensions, outer dimensions, and the like) along its longitudinal axis 182. The illustrated sidewall 176 has a substantially uniform wall thickness, even though the average wall thickness of the section 200 was significantly greater than the average wall thickness of the tapered section 142 of the pre-expanded member 140.

With continued reference to FIG. 10, the non-tapered section 200 may have been expanded to induce compressive stresses in a radially adjacent first section 310 of the workpiece 160. The tapered section 142 may have been expanded to induce compressive stresses in a radially adjacent second section 312 of the workpiece 160. The stresses in the second section 312 can be within a desired range of the stresses in the first section 310. In some embodiments, for example, the compressive stresses in the first section 310 are generally equal to, slightly greater than, or slightly less than the compressive stresses in the second section 312. Somewhat uniform compressive stresses can be induced throughout the thickness T of the workpiece 160, even relatively high residual compressive stresses, without significant deformation (e.g., bulging or upset material) at the workpiece second side 222 or deformation of the inner and/or other edges of the second end 174.

The tapered section 142 can be adapted to reduce or limit any volcano effect of the expandable member 140 and/or of a region 300 of the workpiece 160 immediately radially adjacent the second end 174, stress concentrations at the region 300, cupping, and/or distortion of the workpiece, as well as other mechanisms associated with overexpansion, such as, without limitation, unwanted cracking and/or induced shear tears. Stress concentrations can be highly localized stresses that damage the workpiece 160. The tapered section 142 can be employed to prevent the formation of excessively high stress concentrations.

If the workpiece 160 is made of a composite material, such as a composite laminate, the compressive stresses in the first section 310 can be sufficiently close to the compressive stresses in the second section 312 to minimize or limit delamination. For example, the compressive stress can be close enough to one another to prevent reaching the ultimate stress (e.g., ultimate shear stresses) for the composite. The expandable member 140 of FIG. 10 is especially well suited for reducing or eliminating free edge delamination. To minimize, limit, or substantially prevent damage to the material surrounding the opening 150, the amount of radial expansion can be below a threshold amount of expansion that would cause unwanted damage to the workpiece 160.

If the workpiece 160 is made, in whole or in part, of a composite material, the tapered section 142 can be adapted to avoid excessive interlaminar shear stresses attributable to the wave effect during the expansion process in a region of the composite matrix along the length of the hole 150. In this manner, problems associated with the wave effect can be alleviated or avoided altogether. Because many types of delamination may or may not be detectable, delamination may be difficult to identify and may lead to premature failure of the workpiece 160. The expandable member 140 can be installed to significantly improve the working life of the workpiece 160 as compared to conventional members, even though visual inspection of a workpiece with a conventional member may appear similar to the workpiece 160.

The composite materials can include, without limitation, reinforcing elements (e.g., fibers, particles, and the like), fillers, binders, matrix, or the like. Wood, fiberglass, polymers, plastics, metals, ceramics, glass, and the like can be combined to produce the workpiece 160 with properties that are different from the properties of its constituents individually. In some embodiments, the workpiece 160 can comprise a fiber-reinforced composite, particle-reinforced composite, laminate (e.g., a stack of laminas), or combinations thereof. The matrix of the reinforced composites can be made of metal, polymers, ceramics, or other suitable materials for encapsulating other reinforcement features. The laminates can be unidirectional laminates, cross-ply laminates, angle-ply laminates, symmetric laminates, or the like.

Composites may have relatively low strain capabilities as compared to metals. Expansion of the expandable member 140 can cause compressive loading in the composite material surrounding the opening 150. If the compressive loading is too high, fibers in a fiber-reinforced composite material can buckle, which in turn affects the material's properties. Micro-buckling of fibers may significantly reduce the water resistance of the composite material because buckled fibers may cause micro-cracking of the matrix surrounding the fibers. Splitting due to Poisson's ratio effect, matrix yielding, fiber splitting, debonding (e.g., fiber debonding, interlamina debonding, or the like), and other failure modes are often caused by compressive loading or high strains. Strains can be kept at or below a desired level to prevent these types of failure modes when installing the expandable member 140.

FIGS. 11-14 depict embodiments of expandable members, which may be generally similar to the embodiments discussed in connection with FIGS. 1-10, except as further detailed below.

Figure 11:
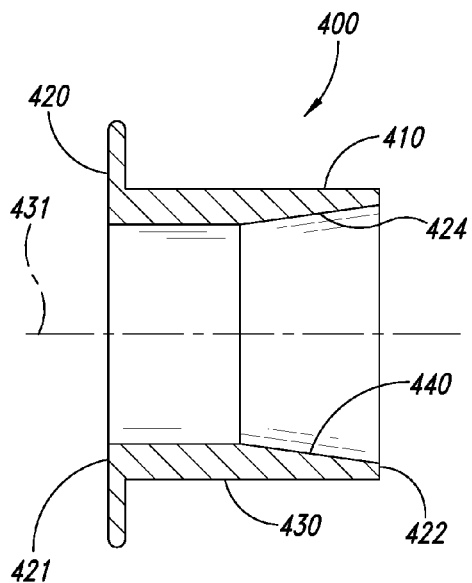
FIGS. 11-14 are longitudinal cross-sectional views of embodiments of expandable members.

FIG. 11 shows an expandable member 400 that includes a tubular main body 410 and a flange 420 extending radially outward from the main body 410. The main body 410 extends between a first end 421 and a second end 422 and includes a tapered section 424 opposite the flange 420 and an outer surface 430 having a generally uniform outer dimension (e.g., a circumference) along a longitudinal axis 431 of the member 400. The tapered section 424 defines an inner surface 440 (illustrated as a frusto-conical surface) that flares radially outwards away from the first end 421 towards the second end 422. Advantageously, a close clearance fit can be formed between the outer surface 430 and a hole of a workpiece before the installation process. Such an embodiment is especially well suited to prevent contaminates from entering gaps between the outer surface 430 and an inner surface of the hole of the workpiece.

Figure 12:
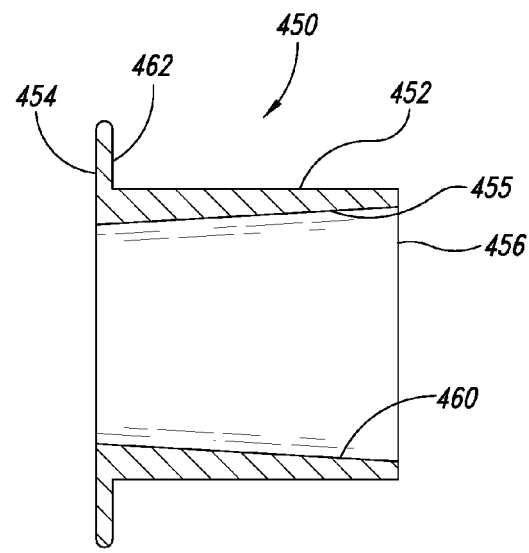

The wave inhibitors disclosed herein can extend along a portion of a longitudinal length of a member or along substantially all of the longitudinal length of a member. FIG. 12 shows, for example, an expandable member 450 that includes a wave inhibitor in the form of a tapered section 452 extending between a first end 454 and an opposing second end 456. The first end 454 includes a flange 462. The illustrated tapered section 452 has an inner surface 455 that defines a longitudinally-extending passageway 460 that flares outwardly away from the first end 454 towards the second end 456. Because the tapered section 452 extends along the entire length of the member 450, the formation of a traveling wave of material can be substantially prevented throughout the entire radial expansion process.

Figure 13:
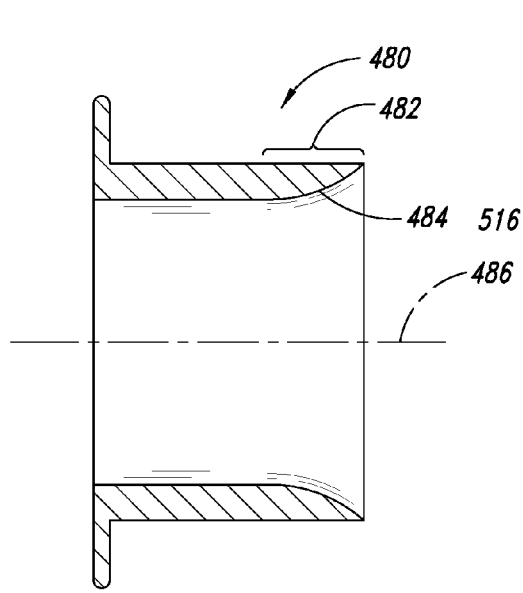

Referring to FIG. 13, a member 480 includes a tapered section 482 having an inner surface 484 that curves radially outwards away from a longitudinal axis 486 of the member 480. The curvature of the inner surface 484 can be selected based on the desired wave canceling effect.

Figure 14:
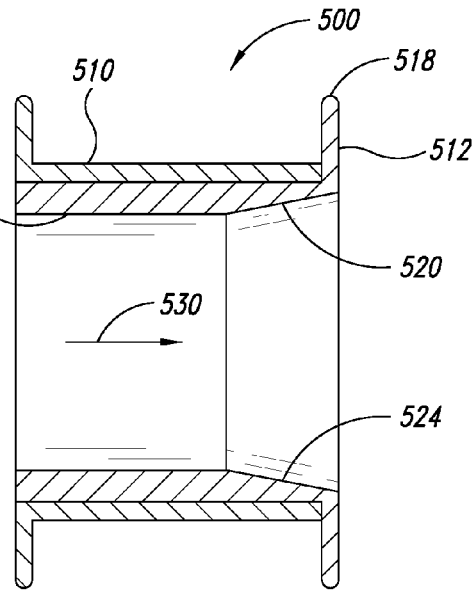

The expandable members can have a one-piece or multi-piece construction. In some embodiments, expandable members can include a plurality of separate components, wherein at least one of the components has one or more tapered sections. FIG. 14 depicts a two-piece member 500 that includes an expandable member 510 surrounding a main body 516 of another expandable member 512. A flange 518 extends radially outward from a tapered section 520 of the member 512. In some embodiments, both members 510, 512 can include at least one tapered section for adjusting the expansion of the workpiece and/or the expansion of the member 500.

Figure 15:
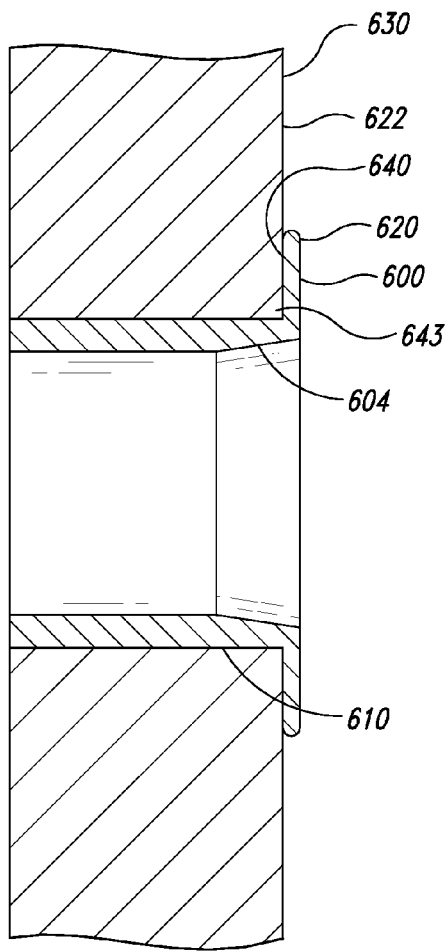
FIG. 15 is a cross-sectional view of an expandable member positioned in a hole of a workpiece before the member has been radially expanded, according to one illustrated embodiment.
Figure 16:
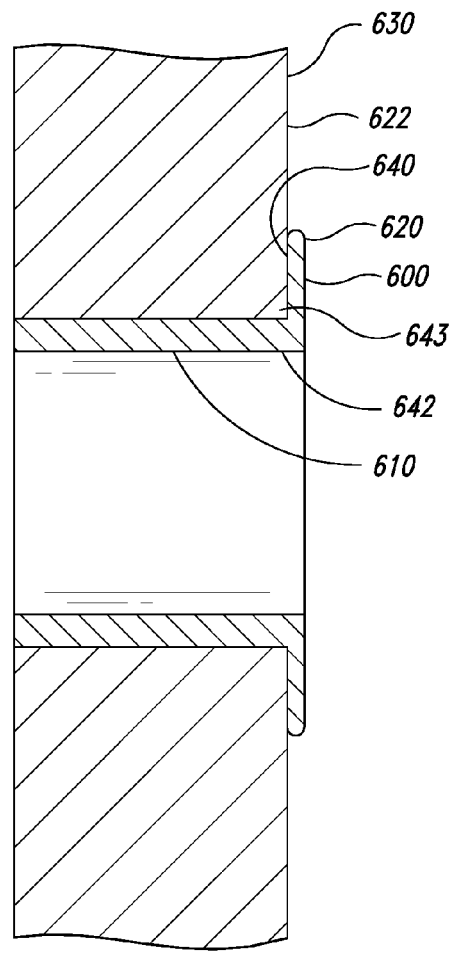
FIG. 16 is a cross-sectional view of the member and workpiece of FIG. 15 after the member has been radially expanded, according to one illustrated embodiment.

FIGS. 15 and 16 illustrate an expandable member 600 in pre-installed and post-installed states, respectively, according to one illustrated embodiment. The member 600, in the pre-installed state, can have a tapered section 604 adapted to minimize, limit, or substantially eliminate lengthening of a tubular body 610 of the member 600. The tapered section 604 of FIG. 15 can at least diminish the wave effect to prevent unwanted movement of the flange 620 relative to the workpiece 630, thereby reducing or eliminating the occurrence of flange cupping. In some embodiments, a face 640 of the flange 620 can physically contact a surface 622 of a workpiece 630 before, during, and/or after the installation process. FIG. 16 shows the face 640 physically contacting the surface 622 of the workpiece 630 and the member 600 having a generally uniform inner diameter 642. The tapered sections discussed in connection with FIGS. 1-14 can also prevent unwanted member lengthening.

If the flange 620 becomes spaced from the surface 622, various types of post installation processes can be performed to bring the flange 620 against the surface 622. As noted above, the tapered section 604 of FIG. 15 can also control any stress concentrations that may otherwise develop near an exit side 643 of the workpiece 630 and/or member 600.

The techniques and methods disclosed herein can also be used to expand holes without permanently installing an expandable member. After the expansion process, the expanded member can be removed from the workpiece. To allow convenient removal, the member can have a split tubular body. For example, the expandable member 140 in FIGS. 3-5 can be a split sleeve with one or more slits that allow for contraction after the expansion process. As such, the expandable member 140 may be particularly well suited to perform cold expansion on holes in wide range of materials, including high strength materials (e.g., high strength aluminums) or other materials that may be prone to cracking or fatigue problems. Thus, the wave effect often associated with cold expansion can be reduced or limited while providing a desired amount of expansion over substantially all or most of the length of the hole.

All patents and publications mentioned herein are hereby incorporated by reference in their entireties. Except as described herein, the embodiments, features, systems, devices, materials, methods and techniques described herein may, in some embodiments, be similar to any one or more of the embodiments, features, systems, devices, materials, methods and techniques described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; and 5,433,100; and in U.S. patent application Ser. Nos. 09/603,857; 10/726,809; 10/619,226; and 10/633,294, and in Provisional Patent Application No. 61/034,843, which are incorporated herein by reference. In addition, the embodiments, features, systems, devices, materials, methods and techniques described herein may, in certain embodiments, be applied to or used in connection with any one or more of the embodiments, features, systems, devices, materials, methods and techniques disclosed in the incorporated U.S. patents and patent applications.

The articles disclosed herein may be formed through any suitable means. For example, the articles can be formed through injection molding, machining, and other methods disclosed herein. The various methods and techniques described above provide a number of ways to carry out the invention. Of course, it is to be understood that not necessarily all objectives or advantages described may be achieved in accordance with any particular embodiment described herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the disclosed embodiments.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. An expandable member for expanding an opening of a workpiece when an expansion mandrel is passed through a longitudinal passageway of the expandable member, the member comprising:
   a member body having a first end, a second end opposite the first end, a flange extending radially outward from the first end, and a sidewall extending between the first end and the second end and defining the longitudinal passageway, the sidewall including a relatively thick section between the first end and the second end and a longitudinally tapered section that extends from the relatively thick section up to the second end, the tapered section having a longitudinal length substantially parallel to a longitudinal axis of the member body, the longitudinal length being greater than a wall thickness of the relatively thick section, and a wall thickness of the longitudinally tapered section diminishing in the direction of the second end, a diameter of the longitudinal passageway in the longitudinally tapered section of the sidewall increasing linearly along a longitudinal axis of the member body in a direction extending away from the relatively thick section of the sidewall, the tapered section being dimensioned to accommodate displaced material of the member body moving generally along the longitudinal axis of the member body away from the first end towards the second end of the member body when the expansion mandrel moves through the longitudinal passageway to install the member in the opening, the tapered section is adapted to radially expand the workpiece while accommodating the displaced material so as to substantially prevent stress concentrations associated with the displaced material in a portion of the workpiece radially adjacent to the second end of the member body.

2. The expandable member of claim 1, wherein the tapered section is configured to induce compressive stresses in the workpiece as a tapered section of the mandrel moves along a length of the tapered section and expands the tapered section.

3. The expandable member of claim 1, wherein the member body is configured to produce substantially uniform stresses throughout material of the workpiece defining the opening in which the expandable member is installed when the member body is radially expanded into the workpiece.

4. The expandable member of claim 1, wherein the tapered section is sufficiently tapered along the longitudinal axis of the member body towards the second end so as to substantially eliminate stress concentrations caused by the displaced material in the portion of the workpiece radially adjacent to the second end of the member body.

5. The expandable member of claim 1, wherein, in an installed state, the relatively thick section has a first average installed wall thickness that is substantially equal to a second average installed wall thickness of the tapered section.

6. An expandable member for expanding an opening of a workpiece when an expansion mandrel is passed through a longitudinal passageway of the expandable member, the member comprising:
   a member body having a first end, a second end opposite the first end, a flange extending radially outward from the first end, and a sidewall extending between the first end and the second end and defining the longitudinal passageway, the sidewall including a constant thickness portion and a diminishing thickness portion directly adjacent the constant thickness portion, the diminishing thickness portion having a longitudinal length substantially parallel to a longitudinal axis of the member body, the longitudinal length being greater than a wall thickness of the constant thickness portion, and a thickness of the sidewall in the diminishing thickness portion diminishing along the longitudinal axis of the member body in the direction of the second end, wherein the constant thickness portion of the sidewall is located between the first end and the second end, and the diminishing thickness portion of the sidewall extends from the constant section up to the second end, the member body sized so that an outer surface of the constant thickness portion of the sidewall forms a clearance fit with the opening of the workpiece, a diameter of the longitudinal passageway in the diminishing thickness portion of the sidewall increasing linearly along the longitudinal axis in a direction extending away from the constant thickness portion of the sidewall, the diminishing thickness portion being sized to accommodate displaced material of the member body moving generally along the longitudinal axis of the member body away from the first end towards the second end of the member body when the expansion mandrel moves through the longitudinal passageway to install the member in the opening, the diminishing thickness portion radially expands the workpiece while accommodating the displaced material to substantially prevent stress concentrations associated with the displaced material in a portion of the workpiece radially adjacent to the second end of the member body.

7. The expandable member of claim 6, wherein the diminishing thickness portion is configured to induce compressive stresses in the workpiece as a tapered section of the mandrel moves along a length of the diminishing thickness portion and expands the diminishing thickness portion.

8. The expandable member of claim 6, wherein the member body is configured to produce substantially uniform stresses throughout material of the workpiece defining the opening in which the expandable member is installed when the member body is radially expanded into the workpiece.

9. The expandable member of claim 6, wherein the diminishing thickness portion is sufficiently tapered along the longitudinal axis of the member body towards the second end so as to substantially eliminate stress concentrations caused by the displaced material in the portion of the workpiece radially adjacent to the second end of the member body.

10. The expandable member of claim 6, wherein, in a pre-installed state, the constant thickness portion has a first average wall thickness that is greater than a second average wall thickness of the diminishing thickness portion, and wherein, in an installed state, the constant thickness portion has a first average installed wall thickness that is substantially equal to a second average installed wall thickness of the diminishing thickness portion.

* * * * *